United States Patent [19]
Hodge

[11] Patent Number: 5,985,988
[45] Date of Patent: Nov. 16, 1999

[54] INK COMPOSITIONS FOR THERMAL INK-JET PRINTING

[75] Inventor: David John Hodge, Manchester, United Kingdom

[73] Assignee: Zeneca Limited, London, United Kingdom

[21] Appl. No.: 09/011,561

[22] PCT Filed: Jul. 24, 1996

[86] PCT No.: PCT/GB96/01777

§ 371 Date: Feb. 10, 1998

§ 102(e) Date: Feb. 10, 1998

[87] PCT Pub. No.: WO97/06217

PCT Pub. Date: Feb. 20, 1997

[30] Foreign Application Priority Data

Aug. 10, 1995 [GB] United Kingdom .................. 9516371

[51] Int. Cl.$^6$ .............................. C08L 67/02; C09D 11/12
[52] U.S. Cl. ........................ 524/604; 525/437; 524/601; 524/602; 524/605; 524/608; 106/31.13; 106/31.15; 106/31.27; 106/31.57; 106/31.59; 427/385.5; 427/394; 428/480

[58] Field of Search .............................. 525/437; 524/601, 524/602, 604, 605, 608; 106/31.13, 31.15, 31.27, 31.57, 31.59; 428/480; 427/385.5, 394

[56] References Cited

U.S. PATENT DOCUMENTS 5,292,855   3/1994   Krutak et al. ........................... 528/289

FOREIGN PATENT DOCUMENTS 3013209   6/1980   Germany .
63-182384 7/1988   Japan .

*Primary Examiner*—Samuel A. Acquah
*Attorney, Agent, or Firm*—Pillsbury Madison & Sutro LLP

[57] ABSTRACT

A process for coloration of a substrate comprising printing an ink onto the substrate using a thermal ink jet printer, characterised in that the ink comprises water and a water-dissipatable polyester dyed using a disperse dye or solvent soluble dye. An ink comprising a water-dissipatable polyester dyed using a disperse dye or solvent dye and an aqueous medium.

18 Claims, No Drawings

INK COMPOSITIONS FOR THERMAL INK-JET PRINTING

This application is the national phase of international application PCT/GB96/01777 filed Jul. 24, 1996 which designated the U.S.

This invention relates to a thermal ink jet printing process and to inks.

Inks containing water-soluble dyes, water and organic solvents are well known. For example Zeneca's British Patent application No. 2,275,479 describes such inks and their utility in ink jet printing ("IJP").

Inks containing a water-insoluble acrylic polymer and an oil soluble dye are described in U.S. Pat. No. 4,680,332. These inks are suitable for piezoelectric IJP but when they are used in thermal IJP they tend to block printer nozzles giving poor quality images which have a "quilted" appearance.

WO91/06608 describes aqueous inks containing a polyester, water, a pigment and a wax. Whilst these inks are useful in printing presses, the pigments they contain require intensive and expensive milling to make them fine enough to pass through ink jet printer heads and the pigments have a tendency to settle out from the ink on standing for long periods. Furthermore, images formed from inks containing insoluble pigments are generally opaque and this limits their usefulness on overhead projector slides.

There is a need for inks which are suitable for thermal IJP, have high colour strength and give clear, high water-fast images when printed on a substrate.

According to the present invention there is provided a process for coloration of a substrate comprising printing an ink onto the substrate using a thermal ink jet printer, characterised in that the ink comprises water and a water-dissipatable polyester dyed using a disperse dye or a solvent soluble dye.

The water-dissipatable polyester preferably bears ionised carboxy and/or sulphonate groups, especially ionised sulphonate groups, because these assist water dissipatability of the polyester. Such groups can be chain pendant and/or terminal in the polyester.

The water-dissipatable polyester can be prepared using conventional polymerisation procedures known to be effective for polyester synthesis. Thus, it is well known that polyesters contain carbonyloxy (i.e —C(═O)—O—) linking groups and may be prepared by a condensation polymerisation process in which an acid component (including ester-forming derivatives thereof) is reacted with a hydroxyl component. The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(═O)—NH— (i.e. amide linking groups) by including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Polyesters bearing ionised sulphonate groups may be prepared by using at least one monomer having two or more functional groups which will readily undergo an ester condensation reaction (e.g carboxyl groups, hydroxyl groups or esterifiable derivatives thereof) and one or more sulphonic acid groups (for subsequent neutralisation after polyester formation) or ionised sulphonate groups (i.e. neutralisation of the sulphonic acid groups already having been effected in the monomer) in the synthesis of the polyester. In some cases it is not necessary to neutralise sulphonic acid groups since they may be sufficiently strong acid groups as to be considerably ionised in water even without the addition of base. Often, the sulphonic acid or ionised sulphonate containing monomer is a dicarboxylic acid monomer having at least one ionised sulphonate substituent (thereby avoiding any need to effect neutralisation subsequent to polyester formation). (Alternatively, alkyl carboxylic acid ester groups may be used in place of the carboxylic acid groups as ester-forming groups). Such a monomer will therefore be part of the acid component used in the polyester synthesis.

Preferred polybasic carboxylic acids which can be used to form the polyester have two or three carboxylic acid groups. For example, one can use $C_4$ to $C_{20}$ aliphatic, alicyclic and aromatic compounds having two or more carboxy groups and their ester forming derivatives (such as esters, anhydrides and acid chlorides), and dimer acids such as C36 dimer acids. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. The preference for polyols having two hydroxy groups arises because these generally lead to polyesters which, when formulated into inks, have desirably low viscosity, high stability against hydrolysis in aqueous inks and a low tendency to block nozzles in thermal ink jet printers. Suitable polyols having two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols having three hydroxy groups per molecule include triols such as trimethylolpropane (1,1, 1-tris (hydroxymethyl)ethane). Suitable polyols having four or more hydroxy groups per molecule include pentaerythritol (2,2-bis(hydroxymethyl)-1,3-propanediol) and sorbitol (1,2,3,4,5,6-hexahydroxyhexane).

Compounds having two or more groups which readily undergo an ester condensation reaction and have one or more sulphonate groups are dicarboxylic acid monomers having at least one ionised sulphonate group. Examples of such compounds are aromatic dicarboxylic acids having an ionised sulphonate group such as those of Formula (1):

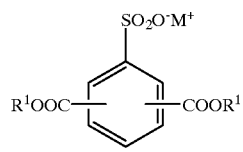
(1)

wherein M is a cation (preferably sodium, lithium or potassium); and $R^1$ is H, a cation or $C_{1-4}$-alkyl (preferably methyl or ethyl). Preferred compounds of Formula (1) are of the Formula (2):

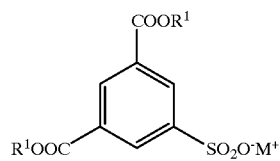
(2)

wherein M and $R^1$ are as defined above. Particularly preferred is the mono sodium salt ($R^1$=H), this material being known as sodio-5-sulphoisophthalic acid (SSIPA).

Other useful compounds which have two or more groups which readily undergo an ester condensation reaction and have one or more sulphonate groups are dihydroxy monomers having at least one sulphonate group, especially those of Formula (3):

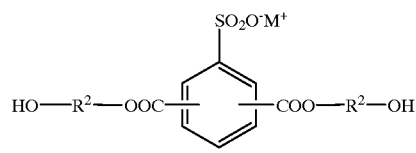
(3)

wherein M is as hereinbefore defined above and $R^2$ is an alkylene, preferably $C_{2-4}$-alkylene. Preferred compounds of Formula (3) are of the Formula (4):

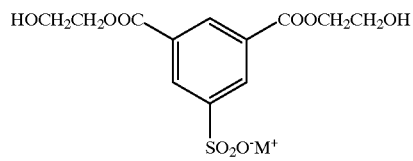
(4)

wherein M is as hereinbefore defined.

Polyesters bearing ionised carboxy groups can be prepared by various means. For example, if the hydroxyl component of the reactants is stoichiometrically in excess of the acid component, a hydroxyl-terminated polyester can be formed, which may be subsequently converted to a carboxy terminated polyester by reacting the hydroxyl groups with an appropriate reagent (e.g an acid anhydride or a dicarboxylic acid). Alternatively, terminal carboxy functionality may be directly introduced by employing an appropriate stoichiometric excess of the acid component reactants. In another alternative, chain-pendant carboxy groups may be introduced by using reagents such as dimethylol propionic acid (DMPA) since if appropriate reaction condition are employed (e.g. polymerisation temperature below 150° C.) the hindered carboxy group thereof does not take part to any significant extent in the ester-forming reactions during the polyester synthesis and the DMPA effectively behaves as a simple diol. Chain-pendant and/or terminal carboxy groups could also be introduced by employing a tri- or higher functionality carboxylic acid or anhydride in the polyester synthesis, for example, trimellitic acid or anhydride. Combinations of the above procedures could also be used. It is thus seen that terminal or side-chain carboxy groups or both can be introduced as desired. These can be fully or partially neutralised with an appropriate base to yield ionised carboxy groups. The counter ions used may be as for the ionised sulphonate groups described above (apart from $H^+$ since the carboxylic acid groups themselves are normally insufficiently ionised to provide a significant amount of ionised carboxy groups—although F substituents would increase acid strength), with alkali metal ions such as $Na^+$, $Li^+$ and $K^+$ again being particularly preferred, and ammonium and organic amine derived cations less preferred because some have an undesirable odour.

The water-dissipatable polyester preferably has hydrophilic non-ionic segments, for example within the polyester backbone (i.e. in-chain incorporation) or as chain-pendant or terminal groups. Such groups may act to contribute to the dispersion stability or even water-solubility of the polyester. For example, polyethylene oxide chains may be introduced into the polyester during its synthesis by using as part of the hydroxyl component, ethylene oxide-containing mono, di or higher functional hydroxy compounds, especially polyethylene glycols and alkyl ethers of polyethylene glycols, examples of which include:

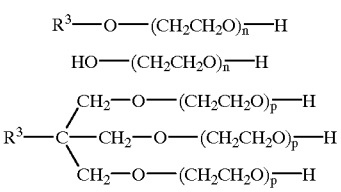

wherein $R^3$ is $C_{1-20}$-alkyl, preferably $C_{1-4}$-alkyl, more preferably methyl; n is 1 to 500; and p is 1 to 100.

A small segment of a polyethylene oxide chain could be replaced by a propylene oxide or butylene oxide chain in such non-ionic groups, but should still contain ethylene oxide as a major part of the chain.

The amount of ionised sulphonate and/or carboxy groups present in the polyester should be sufficient to provide or contribute to water-dissipatability of the polyester, although it should not be so high as to render the resulting polyester unacceptably water-sensitive. This amount will depend, inter alia, on factors such as the hydrophilicity/hydrophobicity of units provided by other monomers in the polyester synthesis or any surfactants (if used), and also the relative proportions of ionised sulphonate/carboxy groups. With regard to the last mentioned point, ionised sulphonate groups are more effective at providing or contributing to water-dissipatability than ionised carboxy groups and so can be used at considerably lower levels in comparison to ionised carboxy groups.

If the polyester is wholly or predominantly sulphonate stabilised (by which is meant the water dissipatability-providing groups are provided wholly or predominately by ionised sulphonate groups) the ionised sulphonate group content is preferably within the range from 7.5 to 100 milliequivalents (more preferably 10 to 75 milliequivalents and particularly 11 to 56 milliequivalents) per 100 g of polyester. When using SSIPA as the monomer for providing the ionised sulphonate groups, the amount of this monomer used in the polyester synthesis, based on the weight of all the monomers used in the polyester synthesis, will usually be within the range from 2 to 20% by weight (more usually 3 to 15% by weight). The carboxylic acid value (AV) of the polyester which is predominantly sulphonate stabilised, i.e. an AV based on the carboxylic acid groups only (i.e. excluding sulphonate groups) will generally be within the range of from 0 to 100 mgKOH/g, more preferably 0 to 50 mgKOH/g, and particularly 0 to 25 mgKOH/g.

If the polyester is predominantly stabilised by ionised carboxy groups, the carboxylic acid value AV of the polyester is preferably within the range of from 20 to 140 mgKOH/g (more preferably 30 to 100 mgKOH/g).

Usually, the polyester is either predominantly sulphonate-stabilised or predominantly carboxylate stabilised (preferably the former).

If the polyester contains polyethylene oxide chains, the polyethylene oxide chain content should preferably not exceed 25% by weight (and more preferably should not exceed 15% by weight), based on the total weight of the polyester, in order to avoid unacceptable water-sensitivity. Therefore the amount is preferably 0 to 25% by weight (more preferably 0 to 15% by weight) based on the total weight of polyester.

The water-dissipatable polyester preferably has a number average molecular weight Mn of below 2500, preferably $\leq 2100$ and more preferably $\leq 1900$. From a practical viewpoint the minimum value of Mn will usually be 500, more usually 750. Therefore a preferred range for Mn is 500 to <2500 (more preferred 750 to <2500, still more preferred 750 to 2100). The measurement of Mn is well known to those skilled in the art, and may e.g. be effected using gel permeation chromatography in conjunction with a standard polymer such as polystyrene or polymethylmethacrylate of known molecular weight.

The Tg of the water-dissipatable polyester (i.e. the temperature at which the polymer changes from a glassy, brittle state to a plastic, rubbery state) is preferably in the range 20 to 105° C., more preferably 20 to 70° C.

The water-dissipatable polyester preferably has a hydroxyl number within the range from 20 to 300 mgKOH/g (more preferably 40 to 350 mgKOH/g).

Preferably the pH of the water-dissipatable polyester is from 1.5 to 10, more preferably from pH 2.5 to 4.5 if predominantly sulphonate stabilised and pH 6.5 to 10 (particularly 7 to 9) if predominantly carboxy stabilised. The solids content is preferably from 5 to 55 wt % (on a total weight basis) more preferably 10 to 45 wt %. Solution viscosity is usually within the range of from 5 to 500 centipose (Brookfield viscosity at 25° C.).

The water-dissipatable polyester may also be formed by performing free radical polymerisation of olefinically unsaturated monomers in the presence of a polyester. This gives what could be called a polyester-acrylic hybrid. Olefinically unsaturated monomers which can be used include olefinically unsaturated carboxy functional monomers, e.g. acrylic acid, methacrylic acid, fumaric acid, itaconic acid and β-carboxyethyl acrylate; olefinically unsaturated monomers which are free from carboxy and hydroxy groups, e.g. 1,3-butadiene, isoprene, styrene, vinylidene halides, vinylidene esters and esters of acrylic acid and methacrylic acid, e.g. methyl (meth) acrylate, ethyl (meth)acrylate n-butyl (meth)acrylate and 2-ethyl hexyl (meth)acrylate; and olefinically unsaturated monomers having a hydroxy group e.g. N-methylol (meth)acrylamide and hydroxy $C_{2-8}$-alkyl esters of (meth)acrylic acid. If the polyester has been prepared using a component which has unsaturation therein, e.g. fumaric acid, maleic acid or muconic acid or allyl-containing dihydroxy or dicarboxy compounds, the product from the polyesterification reaction will have unsaturation incorporated into its structure which can take part in the free radical polymerisation to give a graft copolymer. The free radical polymerisation processes use a free-radical generating initiator system such as (for example) the redox radical initiator system tertiary butylhydroxide/isoascorbic acid and will take place in the aqueous phase, rather than in the melt. However, excessive amounts of acrylic polymer (whether formed in the presence of polyester which has unsaturation or is free from unsaturation) often leads to a deterioration in ink properties and it is preferred that no acrylic polymer is present or, if its is present, the amount is less than 40%, preferably less than 30%, more preferably less than 10% by weight relative to the weight of polyester.

The esterification polymerisation processes for making the polyesters for use in invention composition are known and need not be described here in more detail. Suffice to say that they are normally carried out in the melt using catalysts, for example a tin-based catalyst, and with the provision for removing any water or alcohol formed from the condensation reaction.

The water-dissipatable polyester may be readily prepared by dissipating the solidified melt from the condensation polymerisation directly into water. The solidified melt is preferably in a form such as flake (which can often be obtained directly from the melt) or comminuted solid (obtained for example by grinding). Alternatively, water can be added directly to the hot polyester melt until the desired solids content/viscosity is reached. Still further, the polyester may be dissipated in water by adding an aqueous pre-dissipation (or organic solvent solution) of the polyester to the water phase.

The water-dissipatable polyesters normally do not need an external surfactant when being dissipated into water, although such surfactants may be used to assist the dissipation if desired and in some cases can be useful in this respect because additional surfactants reduce the required amount of dissipating groups (i.e. sulphonate, and (mono alkoxy) polyalkylene chains if used).

Water-dissipatable polyesters can also be purchased from Eastman Kodak Company and Zeneca Limited. Examples include Eastman AQ29D and AQ55W.

The dyed water-dissipatable polyester is preferably prepared by heating a water-dissipatable polyester and a disperse dye or solvent soluble dye at an elevated temperature, for example at a temperature in the range 35 to 150° C., preferably from 40 to 90° C. Simply mixing the disperse dye and polyester in water at room temperature leads to a slight up-take of colour but heating is necessary for a full dyeing. Alternatively, the solid water-dissipatable polyester resin and the disperse or solvent soluble dye are dissolved in an organic solvent and the solvent is removed by evaporation. This gives a clear, intensely coloured polyester which may then be diluted with water and optionally an organic solvent to give an ink.

The time required to dye the water dissipatable polyester with the disperse or solvent soluble dye is reduced if the dyeing is carried out in the presence of a glycol or non-ionic surfactant. The presence of the glycol or non-ionic surfactant also aids the removal of excess dye by filtration at the completion of the dyeing operation. Preferred levels of glycol are 5–30%, more preferably 10 to 25% by weight.

The disperse or solvent-soluble dye can be any water-insoluble dye which is soluble in the water-dissipatable polyester. Disperse and solvent soluble dyes are distinct from pigments in that pigments are insoluble in organic solvents and polyesters whereas disperse and solvent soluble dyes are soluble in organic solvents and polyesters. Useful classes of disperse and solvent soluble dyes include water-insoluble anthraquinones, phthalocyanines, pyrrolines, triphenodioxazines, methines, benzodifuranones, coumarins, indoanilines, benzenoids and azoics. Examples of preferred azoics are monoazo, disazo and trisazo disperse and solvent soluble dyes; preferred azoics contain heterocyclic groups. The Colour Index International lists suitable disperse and solvent soluble dyes, examples of which include Solvent Blue 63, Disperse Blue 24 and Disperse Red 60.

Further examples of disperse dyes are given in the Colour Index; 3rd Edition, Volume 2, pages 2483 to 2741 and further examples of solvent soluble dyes are given in Volume 3, pages 3566 to 3647 and each of these dyes is included herein by reference.

The amount of dyed water-dissipatable polyester contained in the ink will vary according to the depth of shade required. Typically, however, the ink will comprise 1 to 40, preferably 1 to 25, more preferably 2 to 15 parts of dyed water-dissipatable polyester per 100 parts of water, wherein all parts are by weight.

The disperse or solvent dye content in the dyed water-dissipatable polyester preferably lies in the range 0.5% to 40%, more preferably 1% to 20%, especially 2% to 10% by weight relative to the weight of polyester.

According to a further feature of the present invention there is provided an ink comprising a water-dissipatable polyester dyed using a disperse dye or solvent soluble dye and an aqueous medium.

The ink may also contain a water-soluble organic liquid, especially those described in Zeneca's UK patent application No. 2,275,479A, page 1 line 20 to page 2, line 18 which are incorporated herein by reference thereto, and cyclic esters and amides such as lactones and lactams.

In one embodiment the ink comprises (a) 0.2 to 30 parts, preferably 0.5 to 20 parts, more preferably 0.8 to 10 parts of water-dissipatable polyester dyed using a disperse dye or solvent soluble dye; (b) 1 to 50 parts, preferably 2 to 40 parts, more preferably 3 to 35 parts of a water-soluble organic liquid; and (c) 10 to 90 parts, preferably 30 to 85 parts, more preferably 40 to 80 parts of water; wherein the total number of parts (a)+(b)+(c) add up to 100. The preferred water-soluble organic liquid is as described above.

An inherent viscosity of from 0.1 to 1.0 (as measured in 60/40 parts by weight solution of phenol/$CCl_4$ at 25° C. and concentration of 0.25 g of polymer in 100 ml of the solvent) is preferred for the ink.

We have found that the thermal ink jet printing process works particularly well if the ink contains an alkylene glycol, particularly diethylene glycol, pentane-1,5-diol, thiodiglycol or hexylene glycol, as part of all of the water-soluble organic liquid. Such glycols can improve the intensity of coloration and lower the chances of nozzle blockage in the thermal ink jet printer. The glycol, when present in the ink, preferably constitutes 5 to 50%, more preferably 10 to 30% of the ink by weight.

Use of disperse and solvent soluble dyes to dye polyesters of the present invention has advantages over the use of pigments in that less dye is usually required than would be the case for a pigment, expensive milling is avoided, the inks are less likely to form a precipitate on standing, a far greater variety of shades are available and the resultant prints have good transparency. The latter quality is particularly important for the production of coloured substrates which require transparency, for example over-head projector slides and colour filters used in LCD television screens.

A valuable feature of the invention is the low tendency for blocking the nozzles of thermal ink jet printers. Many other water dispersible polymer inks work poorly or even not at all in thermal printers. Inks of the invention form discrete droplets on the substrate with little tendency for diffusing. Consequently sharp images can be obtained, resulting in excellent print quality and little if any bleed between colours printed side-by side.

The invention is further illustrated by the following examples in which all parts and percentages are by weight unless specified otherwise.

EXAMPLES

Resin 1

This reaction was performed under a nitrogen atmosphere in a 3l flask fitted with a Vigreaux column, using the following ingredients:

| Ingredient | Abbreviation | Weight (g) |
| --- | --- | --- |
| Neopentyl glycol | A | 264.67 |
| Trimethylol propane | B | 151.98 |
| Methoxy PEG750 | C | 77.09 |
| Isophthalic acid | D | 338.27 |
| Sodio-5-sulpho-isophthalic acid | E | 102.79 |
| Adipic acid | F | 65.19 |
| Fastcat 4101 | G | 0.76 |

Ingredients A,B,C,E, 50% of D and 75% of G were heated to 175° C. until the mixture was clear. The remainder of D and G were added, the mixture was heated to 210° C. and maintained at this temperature. Reduced pressure was used during the latter stages of the reaction until the mixture had an acid value of 6.3mg KOH/g. The mixture was cooled, ground and dispersed by adding cold water (1000 ml). The resultant water dissipatable polyester resin, hereinafter called Resin 1, had a solids content of 32%, and pH 2.7.

Resin 2

Resin 2 was Eastman AQ29D purchased from Eastman Kodak. This resin was a water-dissipatable polyester having sulphonate groups but no polyalkylene glycol groups.

Preparation of Resin 3

Ingredients

| | |
| --- | --- |
| Initial charge | Resin 1 (25% strength, 300 g), Water (125 g), lauryl mercaptan (0.2 g) and sodium bicarbonate (0.025 g) |
| Monomer Feed | ethyl acrylate (6.85 g) and methyl methacrylate (18.15 g). |
| Initiator Feed | ammonium persulphate (0.075 g) and water (48 g) |
| Burn-up Feed | ammonium persulphate (0.025 g) and water (2 ml) |

A one liter flask fitted with a stirrer paddle and condenser was charged with the initial charge and heated to 80° C. 10% of the monomer feed was added and the mixture was stirred for 5 minutes until the temperature reached 85° C. 30% of the initiator feed was added and, after 2 minutes, the remaining 90% of the monomer feed was added over 1 hour along with the remaining 70% of the initiator feed which was added over 70 minutes, maintaining the temperature at 88° C. When co-addition of the monomer and initiator feeds was complete the burn-up feed was added in one shot and the mixture was stirred for 1 hour at 85° C. The resultant resin was cooled and filtered to remove unwanted solids to give a water dissipatable polymer.

Resin 4

The method described for Resin 1 above was followed except that the following ingredients were used:

| Ingredient | Abbreviation | Weight (g) |
| --- | --- | --- |
| Neopentyl glycol | A | 308.25 |
| Trimethylol propane | B | 163.8 |
| Isophthalic acid | D | 364.51 |
| Sodio-5-sulpho-isophthalic acid | E | 110.7 |
| Adipic acid | F | 70.25 |
| Fastcat 4101 | G | 0.76 |

The resultant water dissipatable polyester resin, hereinafter called Resin 4, had a solids content of 31.7% and acid value of 8.3 mgKOH/g.

Resin 5

This reaction was performed under a nitrogen atmosphere in a 3l flask fitted with a Vigreaux column using the following ingredients.

| Ingredient | Abbreviation | Weight (g) |
| --- | --- | --- |
| Neopentyl glycol | A | 206.25 |
| Diethylene glycol | B | 82.5 |
| Isophthalic acid | C | 300 |
| Sodio-5-sulpho-isophthalic acid | D | 75 |
| Adipic acid | E | 37.5 |
| Methoxy PEG 750 | F | 75 |
| Sodium Acetate | G | 1.5 |
| Fastcat 4101 | H | 0.75 |

Ingredients A,B,D,G, 50% of C and 50% of H were stirred at 210° C. until the mixture was clear. The remainder of C and H were added and the temperature raised to 230° C. The latter part of the reaction was performed under reduced pressure to remove water and the reaction was terminated at an acid value of 5.3. The resin was dispersed by addition of water (1.5 l) and rapid stirring to give a clear dispersion having a solids content of 31.2% and an acid value of 5.3 mgKOH/g.

Resin 6—Comparative

| Ingredient | Abbreviation | Weight (g) |
| --- | --- | --- |
| Resin 1 (25% strength) | A | 200 g |
| Water | B | 203 g |
| Ethyl Acrylate | C | 13.7 g |
| Methyl Methacrylate | D | 36.3 g |
| Sodium Bicarbonate | E | 0.05 g |
| Lauryl Mercaptan | F | 0.4 g |
| Water | G | 15 g |
| Ammonium Persulphate | H | 0.15 g |
| Water | I | 2 g |
| Ammonium Persulphate | J | 0.05 g |

Ingredients A and B were added to a 1 liter flask fitted with stirrer paddle and a condenser and the temperature raised to 80° C. 10% of C,D,E,F and G was then added and the temperature raised to 85° C. 30% of a solution of H in G were then added. After two minutes the remainder of C,D,E,F and G was added over a period of 60 minutes. At the same time, the remainder of the solution of H and G was added over a period of 70 minutes. After the two feeds were completed, a solution of J in I was added and the reaction stirred for 1 hour at 85° C. then cooled. The resultant water-dissipatable polyester, hereinafter called Resin 6, had a solids content of 19.9 wt %.

Resin 7—Comparative

| Ingredient | Abbreviation | Weight (g) |
| --- | --- | --- |
| Polyester A | A | 149.6 |
| Water | B | 398.0 |
| Styrene | C | 81.9 |
| Butyl Acrylate | D | 30.9 |
| Ammonium Persulphate | E | 1.33 |
| Water | F | 37.5 |

Polyester A (having the composition:tetrahydrophthalic anhydride (45.5%), dimethylol propionic acid (22.7%) and trimethylol propane (31.8%) with an acid value of 75.1 and a solids content of 100%) was dissolved in B in a 1 liter flask at 90° C. and neutralised to pH 8.8 using ammonia.

The solution was heated to 60° C. and 10% of C and D were added with 15% of a solution of E in F. The temperature was raised and held at 80° C. for 30 minutes then the remainder of C and D and 80% of E in F were added over a period of 90 minutes. The final 10% of E in F was then added and the temperature raised to 85% for 30 minutes. The mixture was then cooled to give a water dissipatable polyester, hereinafter called Resin 7, having a solids content of 35.0%, a pH of 8.5.

Resin 8—Comparative

This was Neocryl XK70, an acrylic resin obtained from Zeneca Resins.

Resin 9—Comparative

This resin was Neorez R974, a carboxy functional polyurethane obtained from Zeneca Resins.

Resin 10—Comparative

This resin was a sulphonate stabilised polyurethane, obtained as follows.

| Ingredient | Abbreviation | Weight (g) |
| --- | --- | --- |
| Isophorone Diisocyanate | A | 249.6 |
| Cyclohexane dimethanol | B | 31.1 |
| Potyester Diol (OH number 126) | C | 185.3 |
| Sodio-5-sulpho-1,3-benzene dicarboxylic acid-1,3-dihydroxy ethyl ester | D | 69.84 |
| N-methyl pyrrolidone | E | 126.95 |
| Dibutyltindilaurate | F | 0.25 |
| Hydrazine monohydrate | G | 20.2 |
| Water | H | 770.0 |

E and D were stirred in a 1 liter flask and heated to 70° C. to give a solution. Ingredients A,B and C were then added and the temperature maintained at 70° C. for 30 minutes. 50% of F was then added and the mixture stirred for 1 hour, keeping the temperature below 95° C. by external cooling. The remaining 50% of F was added and the temperature kept below 95° C. for a further hour. The resultant warm prepolymer (75–80° C., 600 g), was then added slowly, with rapid stirring, to a solution of G in H (20–25° C.) over a period of one hour. The resultant sulphonate stabilised polyurethane polymer had a solids content of 37.5 wt %, a pH of 6.8.

Resin 11—Comparative

This resin was a sulphonate/polyethyleneglycol stabilised polyurethane, obtained as follows.

| Ingredient | Abbreviation | Weight (g) |
|---|---|---|
| Isophorone Diisocyanate | A | 249.6 |
| Cyclohexane Dimethanol | B | 32.3 |
| Polyester Diol (OH number 126) | C | 129.5 |
| Sodio-5-sulpho-1,3-benzene dicarboxylic acid-1,3-dihydroxy ethyl ester | D | 69.8 |
| N-methyl pyrollidone | E | 126.9 |
| Polyether diol | F | 53.6 |
| Dibutyl tin dilaurate | G | 0.25 |
| Hydrazine Monohydrate | H | 20.6 |
| Water | I | 770.0 |

The method was the same as described above for Resin 10 except that polyether diol F (described in U.S. Pat. No. 5,153,259, Example 4 was added in conjunction with A,B and C. The resultant sulphonate/polyethylene glycol stabilised polyurethane had a solids content of 37.15%, a pH of 6.8.

General Dyeing Methods

The following four general methods are referred to in Table 1 below.

Dyeing Method 1—Dyeing at Elevated Temperature

Water (7.6 ml) and SOLSPERSE 27000 (0.4 g, a hyperdispersant from Zeneca Limited) were added to a 28 ml capacity glass vial. The subject dye (2.0 g) and glass beads (3 mm diameter, 17.5 g) were added and the sealed vial was shaken using a horizontal shaker for 16 hours. The resultant dye dispersion (2 g) was mixed with the resin under investigation adjusted to have a 20% solids content. The mixture was sealed in a metal pot and the sealed pot was heated at 130° C. for 1 hour using a Graham Jamin high temperature dyeing apparatus. The resultant dyed resin was cooled and filtered through a 0.45 mm filter to remove unwanted particulate matter.

Dyeing Method 2—Dyeing via an Organic Solvent

Solid Resin under investigation (10 g), direct from the reaction vessel, and the subject dye (0.5 g) were dissolved in $CH_2Cl_2$ (90 g). The $CH_2Cl_2$ was removed in-vacuo to give a clear, intensely coloured sticky solid. 3.1 g of the sticky solid was mixed with water (27.9 g) and the mixture stirred at room temperature to give a clear, particle-free, concentrated composition comprising water and dyed resin.

Dyeing Method 3

A dye solution containing dye (2 g) dissolved in $CH_2Cl_2$ (30 ml) was added to an aqueous solution of dodecyl sulphate (0.25% strength) (50 ml) and the mixture was subjected to high shear mixing for 5 minutes to give a homogenous emulsion having a 20% solids content. The emulsion was added to the Resin and after 3 hours the solvents were removed by evaporation. The resultant dyed resin was filtered through a 0.45 μm filter to remove unwanted solids.

Dyeing method 4

Dyeing method 1 was repeated except that said mixture was stirred for 30 minutes at a temperature of 80° C. in an open vessel instead of 130° C. for 1 hour in the high temperature dyeing apparatus.

Ink Preparation and Testing

Table 1 below shows how resins were dyed, formulated into inks and indicates their properties after being printed onto plain paper using a Hewlett Packard HP Desk Jet thermal ink jet printer. The optical density, image sharpness and jet blockage were assessed visually. Water-fastness of prints was assessed by printing a series of parallel lines 2.5 mm wide, 5 mm apart, onto plain paper. The printed paper was mounted at an angle of 45°, 0.25 ml of distilled water was run across these lines and the water-fastness was scored 1 to 10 wherein 10=no dye washed-off and 1=most of the dye washed-off.

Table 2 contains comparative examples using a water-soluble dye (i.e. not a disperse or solvent soluble dye) called PROCION Crimson H-EXL, obtained from Zeneca Ltd, Manchester, England, and/or polymers which fall outside the scope of the present invention.

The Magenta, Cyan and Yellow dyes referred to in Table 1 and 2 had the following structures:

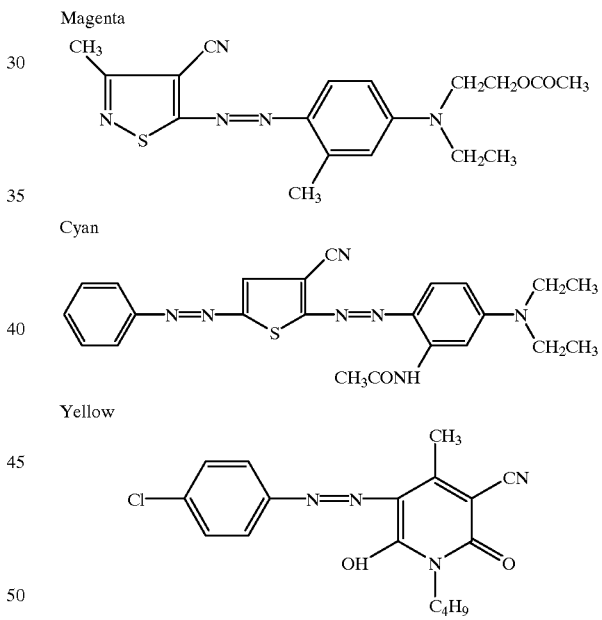

TABLE 1

| Example | Ink formulation | Dye | Dyeing Method | Optical Density | Water-fastness after time drying | Comments |
|---|---|---|---|---|---|---|
| 1 | Dyed Resin 1 (20% solids) (2.5 g) Water (5.0 g) Hexyleneglycol (2.5 g) | Magenta | 1 | High | 10 @ 0 min | Sharp image, no evidence of jet blockage. No deterioration of print after 6 prints |
| 2 | Dyed Resin 2 (5% solids) (9 g) Diethylene glycol (1 g) | Cyan | 3 | High | 10 @ 0 min | "Quilted" image indicating intermittent nozzle blockage |
| 3 | Dyed Resin 3 (19.5% solids) (9 g) Diethylene glycol (1 g) | Magenta | 3 | High | 8 @ 5 min | Sharp image, no jet blockage |

TABLE 1-continued

| Example | Ink formulation | Dye | Dyeing Method | Optical Density | Water-fastness after time drying | Comments |
|---|---|---|---|---|---|---|
| 4 | Dyed Resin 4 | Magenta | 1 | High | 10 @ 0 min | as for 1 above |
| 5 | Dyed Resin 5 | Magenta | 4 | High | 10 @ 0 min | as for 1 above |

TABLE 2

| Example | Ink formulation | Dye | Dyeing Method | Optical Density | Water-fastness after time drying | Comments |
|---|---|---|---|---|---|---|
| A | Dye (0.25 g) Water (7.25 g) Hexyleneglycol (2.5 g) | PROCION Crimson H-EXL | Simple addition | High | 7 @ 1 hr | Poor water-fastness, even after 1 hour |
| B | Resin 1 (20% Solids) (3.2g) Water (4.05 g) Dye (0.25 g) hexylene glycol (2.5 g) | PROCION Crimson H-EXL | Simple addition | High | 7 @ 1 hr | Poor water-fastness, even after 1 hour |
| C | Resin 9 (40% solids) (1.0 g) Water (4.92 g) hexyleneglycol (2 g) Dye (1 g) | PROCION Crimson H-EXL | Simple addition | None | not measurable | Ink would not elect from thermal printer |
| D | Resin 10 (34% solids) (1.0 g) Water (4.03 g) hexyleneglycol (1.7 g) Dye (0.07 g) | PROCION Crimson H-EXL | Simple addition | None | Not measurable | Ink would not eject from thermal printer |
| E | Resin 11 (34% solids) (1.0 g) Water (4.03 g) hexyleneglycol (1.7 g) Dye (0.07 g) | PROCION Crimson H-EXL | Simple addition | None | Not measurable | Ink would not eject from thermal printer |
| F | Resin 8 (2% solids) (50 g) Dye (0.125 g) diethyleneglycol (5.0 g) | PROCION Crimson H-EXL | Simple addition | None | Not measurable | Ink would not eject from thermal printer |
| G | Dyed Resin 6 (9 g) diethylene glycol (1 g) | Yellow | 3 | None | Not measurable | Ink would not eject from thermal printer |
| H | Dyed Resin 7 (9 g) diethylene glycol (1 g) | Yellow | 3 | None | Not measurable | Ink would not eject from thermal printer |

I claim:

1. A process for coloration of a substrate comprising printing an ink onto the substrate using a thermal ink jet printer, characterised in that the ink comprises water and a water-dissipatable polyester dyed using a disperse dye or solvent soluble dye.

2. A process according to claim 1 wherein the polyester bears ionised carboxy and/or sulphonate groups.

3. A process according to claim 1 or 2 wherein the polyester bears ionised sulphonate groups.

4. A process according to claim 1 or 2 wherein the polyester has hydrophilic non-ionic segments.

5. A process according to claim 4 wherein the hydrophilic non-ionic segments are polyethylene oxide chains.

6. A process according to claim 1 or 2 wherein the polyester has an ionised sulphonate group content of from 7.5 to 100 milliequivalents per 100 g of polyester.

7. A process according to claim 1 or 2 wherein the polyester has a Mn of below 2500.

8. A process according to claim 1 or 2 wherein the ink contains 1 to 40 parts of the dyed water-dissipatable polyester per 100 parts of water.

9. A process according to claim 1 or 2 wherein the ink contains an alkylene glycol.

10. A process for preparing a dyed water dissipatable polyester comprising dissolving a disperse dye or solvent soluble dye and a water dissipatable polyester in an organic solvent and removing the solvent by evaporation.

11. A process according to claim 10 which is carried out in the presence of a glycol or non-ionic surfactant.

12. An ink comprising a water-dissipatable polyester having an Mn of below 2,500 bearing ionized sulphonate groups dyed using a disperse dye or solvent dye and an aqueous medium.

13. An ink according to claim 12 which further comprises a water-soluble organic liquid.

14. An ink according to claim 12 or 13 wherein the water-dissipatable polyester has hydrophilic non-ionic segments.

15. An ink according to claim 12 or 13 wherein the ionized sulphonate group content is within the range from 7.5 to 100 milliequivalents per 100 g polyester.

16. An ink according to claim 12 or 13 which contains an alkylene glycol.

17. An ink according to claim 12 or 13 wherein the Tg of the polyester is in the range 20 to 105° C.

18. An ink according to claim 12 or 13 wherein the polyester has a hydroxyl number within the range from 20 to 300 mgKOH/g.

* * * * *